(12) United States Patent
Jung

(10) Patent No.: US 11,603,126 B2
(45) Date of Patent: Mar. 14, 2023

(54) SYSTEM AND METHOD OF CONTROLLING MOTOR-DRIVEN POWER STEERING

(71) Applicants: HYUNDAI MOTOR COMPANY, Seoul (KR); KIA MOTORS CORPORATION, Seoul (KR)

(72) Inventor: Dae Suk Jung, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 306 days.

(21) Appl. No.: 16/987,956

(22) Filed: Aug. 7, 2020

(65) Prior Publication Data
US 2021/0053614 A1    Feb. 25, 2021

(30) Foreign Application Priority Data
Aug. 21, 2019   (KR) .................. 10-2019-0102112

(51) Int. Cl.
*B62D 5/04*   (2006.01)
*B62D 15/02*  (2006.01)
*B62D 6/00*   (2006.01)

(52) U.S. Cl.
CPC ........... *B62D 5/0484* (2013.01); *B62D 5/049* (2013.01); *B62D 6/00* (2013.01); *B62D 15/0235* (2013.01)

(58) Field of Classification Search
CPC ........... B60G 2800/24; B60G 2800/96; B60W 2510/20; B60W 2510/202; B60W 2510/205; B60W 2540/18; B60W 2710/20; B60W 2710/202; B60W 2710/205; B60Y 2400/307; B62D 15/02; B62D 15/0205; B62D 15/021; B62D 15/0215; B62D 15/022; B62D 15/0225; B62D 15/023; B62D 15/0235; B62D 5/00; B62D 5/04; B62D 5/0409; B62D 5/0421;
(Continued)

(56) References Cited

U.S. PATENT DOCUMENTS 9,365,238 B2   6/2016   Tsunoda et al.
9,821,838 B2   11/2017  Hori et al.
(Continued)

FOREIGN PATENT DOCUMENTS

JP   2012-144099 A   8/2012
JP   2012-228922 A   11/2012
(Continued)

*Primary Examiner* — Christian Chace
*Assistant Examiner* — Jordan S Fei
(74) *Attorney, Agent, or Firm* — Morgan, Lewis & Bockius LLP

(57) ABSTRACT

A system and a method of controlling a motor-driven power steering are disclosed. A basic steering torque assist compensation is made according to a LOAM compensation logic under a steering condition such as steering of a steering wheel and holding of the steering wheel after steering, and an additional steering torque compensation is made to reduce the basic steering torque assist compensation amount when returning the steering wheel to the center or releasing the steering wheel in a restoring direction, thereby reducing steering effort felt by a driver when returning the steering wheel to the center or releasing the steering wheel in the restoring direction, and thus maintaining proper steering effort when a torque sensor of a high-performance vehicle fails.

16 Claims, 6 Drawing Sheets

| CASE | Steering condition | $\theta\,sas - \theta\,motor$ | (ex)real value | Acting |
|---|---|---|---|---|
| Release | | $\theta\,hys + T/K(=0)$ | $-1 \sim +1$ | Return |
| Return to center | | $\theta\,hys + T/K$ | $-1-(3-\alpha)=-4\downarrow$ | Return |

$\theta\,hys = \theta\,sas - \theta\,motor$
T : Driver torque
K : System stiffness

(58) Field of Classification Search
CPC .... B62D 5/0457; B62D 5/046; B62D 5/0463; B62D 5/0466; B62D 5/0481; B62D 5/0484; B62D 5/0487; B62D 5/049; B62D 5/0493; B62D 6/00; B62D 6/001; B62D 6/002; B62D 6/007; B62D 6/08; B62D 6/10; G01L 5/221; G05B 2219/2603; Y10T 74/20256
See application file for complete search history.

(56) References Cited

U.S. PATENT DOCUMENTS

| | | | |
|---|---|---|---|
| 2015/0046034 A1* | 2/2015 | Kikuchi | B60G 17/018 |
| | | | 701/37 |
| 2018/0229761 A1* | 8/2018 | Fujita | B62D 5/049 |
| 2020/0324812 A1* | 10/2020 | Matsuo | B62D 5/0463 |

FOREIGN PATENT DOCUMENTS

| | | |
|---|---|---|
| JP | 2014-004920 A | 1/2014 |
| KR | 10-2018-0042906 A | 4/2018 |
| KR | 10-2018-0042907 A | 4/2018 |

\* cited by examiner

| CASE | Steering condition | $\theta sas - \theta motor$ | (ex)real value | Acting |
|---|---|---|---|---|
| Turn more | | $\theta hys + T/K$ | $1+(3+\alpha)=4\uparrow$ | Steering torque assist (Assist) |
| Holding | | $\theta hys + T/K$ | $1+3=4$ | Steering torque assist (Assist) |

$\theta hys = \theta sas - \theta motor$
T : Driver torque
K : System stiffness

| CASE | Steering condition | $\theta$ sas−$\theta$ motor | (ex)real value | Acting |
|---|---|---|---|---|
| Release | | $\theta$ hys+T/K(=0) | −1~+1 | Return |
| Return to center | | $\theta$ hys+T/K | −1−(3−$\alpha$)=−4↓ | Return |

$\theta$ hys= $\theta$ sas− $\theta$ motor
T : Driver torque
K : System stiffness

SYSTEM AND METHOD OF CONTROLLING MOTOR-DRIVEN POWER STEERING

CROSS REFERENCE TO RELATED APPLICATION

The present application claims priority to Korean Patent Application No. 10-2019-0102112, filed Aug. 21, 2019, the entire content of which is incorporated herein for all purposes by this reference.

TECHNICAL FIELD

The present disclosure relates to system and method of controlling motor-driven power steering. More particularly, the present disclosure relates to system and method of controlling motor-driven power steering, the system and method compensating steering torque in order to reduce steering effort of a driver when a torque sensor fails.

BACKGROUND

A motor-driven power steering (MDPS) system, which is a kind of steering system changing a steering effort of a steering wheel according to travel speeds of the vehicles, is mounted on vehicles.

As illustrated in FIG. 1, the MDPS system includes: a steering shaft 10 connected to a steering wheel; a housing 12 in which a rack bar (not illustrated) is built to be movable left and right; a steering gearbox 14 mounted at a predetermined position of the housing 12 to transmit a steering effort of the steering shaft 10 to the rack bar; a motor 30 mounted at a predetermined position outside the housing 12; a reducer 32 reducing a torque of the motor 30 and transmitting the torque to the rack bar; a controller 20 mounted at a position adjacent to the motor 30 to control motor torque, etc.; and a tie rod 16 connecting opposite ends of the rack bar and a steering wheel with each other.

In addition, a torsion bar 11 connected to an input side of the steering gear box is built inside the steering shaft 10, and the torsion bar 11 is equipped with a torque sensor 21 detecting torsional moment of the torsion bar 11 and transmitting the result to the controller 20.

As illustrated in a control block diagram of FIG. 2, an operation flow of the MDPS system including the above configuration is configured such that when the vehicle speed detected by the vehicle speed sensor 22 and the torsional moment (=steering torque=input torque to the torque sensor) of the torsion bar detected by the torque sensor 21 are input to the controller 20, a steering assist current determination device 20-1 of the controller 20 determines steering assist current (steering torque compensation amount) according to torsional moment of the torsion bar varying depending on the vehicle speed on the basis of a steering assist current determination logic, and then the steering assist current determination device 20-1 outputs the result to the motor 30.

As described above, the MDPS system determines steering torque assist amount (steering torque compensation amount) in consideration of the vehicle speed and the torsional moment of the torsion bar.

When a driver steers the steering wheel, steering assist is made by using power of the motor 30 as described above.

However, when the torque sensor 21 fails, the controller executes logic to immediately stop steering assist for safety.

These days, so-called loss of assist mitigation (LOAM) compensation logic has been applied to the controller to provide at least minimal steering assist function despite the failure of the torque sensor.

To this end, as illustrated in FIG. 3, the controller 20 includes a LOAM compensation device 20-2 in addition to the steering assist current determination device 20-1.

Therefore, when the torque sensor 21 fails and vehicle turning information including lateral acceleration (LATAC), yaw rate, or the like is input to the controller 20 by CAN communication, the LOAM compensation device 20-2 of the controller 20 outputs basic steering torque assist compensation amount, which corresponds to the current vehicle turning information, to the motor 30 by using pre-established assist torque map.

For example, in a case of general vehicles, compared with steering torque (solid line of FIG. 4) according to steering angle in the normal condition where the torque sensor does not fail, when the torque sensor fails, the basic steering torque assist compensation amount (hidden line of FIG. 4) constantly increased at the same steering angle by the LOAM compensation device 20-2 is output to the motor 30, whereby steering assist can be easily performed.

However, the conventional LOAM compensation logic has its limitations when applied to high-performance vehicles.

High-performance vehicles are equipped with a steering gearbox having high gear ratio and a reducer to ensure faster steering response compared to general vehicles, and are equipped with high grip tires for increasing contact grip with the ground to improve performance with respect to driving limit. As a result, high-performance vehicles generate higher steering load than general vehicles, and the following problems occur even when the conventional LOAM compensation logic is applied.

For example, in the case of high-performance vehicles, when the torque sensor fails, the basic steering torque assist compensation amount (bold solid line of FIG. 4) in which steering torque is constantly increased by the conventional LOAM compensation logic is output to the motor. However, as described above, due to high steering load, steering effort becomes heavy (circles of FIG. 4) when the steering wheel is returned to the center after steered in one way.

In other words, in the case of high-performance vehicles, when the torque sensor fails, the basic steering torque assist compensation amount (bold solid line of FIG. 4), which is constantly increased by the LOAM compensation device 20-2 as steering angle of the steering wheel is increased, is output to the motor 30, the steering effort felt by the driver is reduced. However, when the driver returns the steering wheel to the center, the driver feels a heavy steering effort (circles of FIG. 4) due to high steering load described above. As a result, there is a limit to applying the conventional LOAM compensation logic to high-performance vehicles.

SUMMARY

Accordingly, the present disclosure has been made keeping in mind the above problems occurring in the related art, and the present disclosure is intended to provide system and method of controlling motor-driven power steering, wherein a basic steering torque assist compensation is made according to a conventional LOAM compensation logic under a steering condition such as one-way steering of a steering wheel and holding of the steering wheel after steering, and an additional steering torque compensation is made to reduce the basic steering torque assist compensation amount when returning the steering wheel to the center or releasing the steering wheel in a restoring direction, thereby reducing steering effort felt by a driver when returning the steering wheel to the center or releasing the steering wheel in the restoring direction and thus maintaining proper steering effort when a torque sensor of a high-performance vehicle fails as well as that of a general vehicle fails.

In order to achieve the above objective, there is provided a system for controlling a motor-driven power steering, the system including: a steering assist current determination device determining steering assist amount according to torsional moment of a torsion bar which varies depending on a vehicle speed; a loss of assist mitigation (LOAM) compensation device outputting basic steering torque assist compensation amount to a motor when a torque sensor fails; and a steering condition-dependent compensation amount determination device determining and outputting additional steering torque compensation amount to the motor to maintain or reduce the basic steering torque assist compensation amount.

In order to achieve another objective, there is provided a method of controlling a motor-driven power steering, the method including: checking whether a torque sensor fails; compensating basic steering torque assist by a LOAM compensation device when the torque sensor is in a fail state; and calculating additional steering torque assist compensation amount by a steering condition-dependent compensation amount determination device to maintain or reduce the basic steering torque assist compensation amount according to a steering condition of a steering wheel.

The present disclosure provides the following effects in accordance with the above technical solution.

In a case of general vehicles, when a torque sensor fails, basic steering torque assist compensation is made by a LOAM compensation logic, whereby steering torque assist compensation in which assist torque is constantly increased can be easily made.

In particular, in a case where a torque sensor of a high-performance vehicle fails, when returning a steering wheel or releasing the steering wheel to the center in a restoring direction, an additional steering torque compensation is made to reduce the basic steering torque assist compensation amount, thereby reducing steering effort felt by a driver when returning the steering wheel to the center or releasing the steering wheel in the restoring direction.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, an embodiment of the present disclosure will be described in detail with reference to the accompanying drawings.

Figure 5:
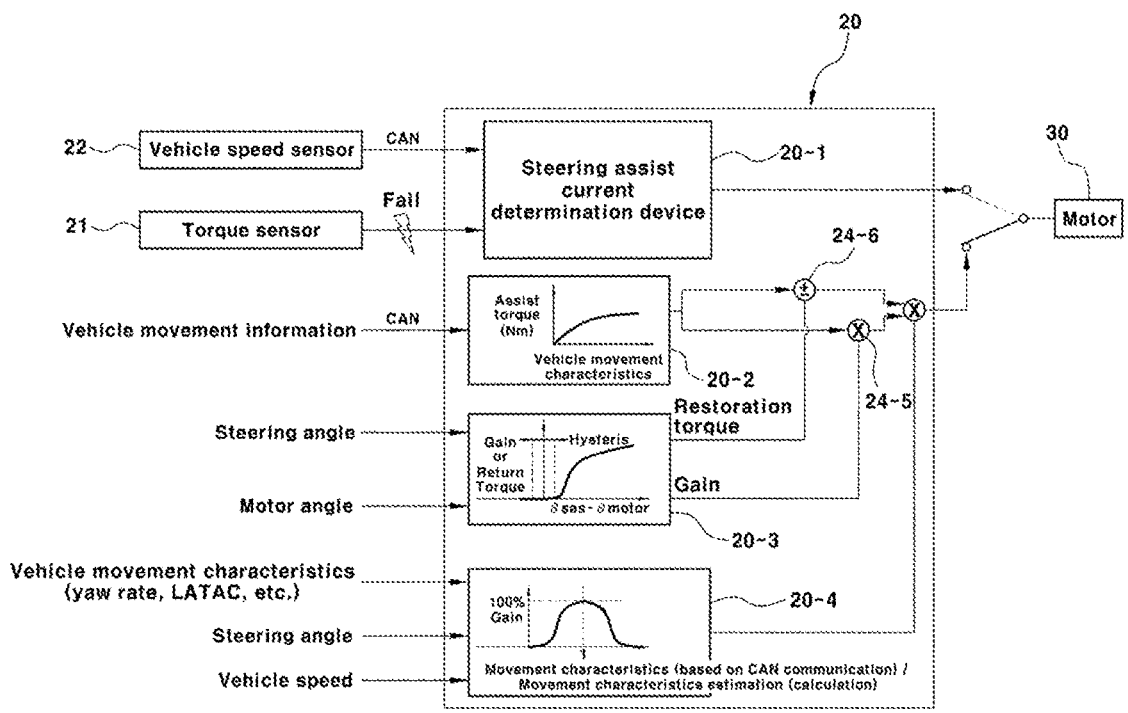
FIG. 5 is a control block diagram illustrating a system for controlling an MDPS according to the present disclosure.

The accompanying drawing FIG. 5 is a control block diagram illustrating a system for controlling a motor-driven power steering (MDPS) according to the present disclosure.

Generally, in a normal state in which a torque sensor does not fail, when vehicle speed detected by a vehicle speed sensor 22 and torsional moment (=steering torque=input torque to a torque sensor) of a torsion bar detected by a torque sensor 21 are input to a controller 20, a steering assist current determination device 20-1 of the controller 20 determines steering assist amount (=steering assist current) according to torsional moment of the torsion bar varying depending on vehicle speeds on the basis of a steering assist current determination logic, and then the steering assist current determination device 20-1 outputs the result to a motor 30, whereby steering torque assist compensation is made.

However, when the torque sensor fails, so-called loss of assist mitigation (LOAM) compensation logic that provides a steering assist function is executed by the controller 20.

To this end, as illustrated in FIG. 5, the controller 20 includes a LOAM compensation device 20-2 in addition to the steering assist current determination device 20-1.

Thus, when the torque sensor 21 fails, the LOAM compensation device 20-2 of the controller 20 determines basic steering torque assist compensation amount (basic compensation amount) using an assist torque map pre-established on the basis of vehicle movement information, and the result is output to the motor 30, whereby steering assist can be easily performed in the case of general vehicles.

The present disclosure is to reduce steering effort felt by a driver while returning a steering wheel to the center or releasing a steering wheel in a restoring direction in order to maintain the proper steering effort when a torque sensor of a high-performance vehicle fails as well as that of a general vehicle fails.

To this end, the controller 20 according to the present disclosure includes: a steering condition-dependent compensation amount determination device 20-3 determining additional steering torque compensation amount (final compensation amount) to maintain or reduce the basic steering torque assist compensation amount determined by the LOAM compensation device 20-2; and a final compensation amount confirmation device 20-4 confirming the additional steering torque compensation amount (final compensation amount), which is determined by the steering condition-dependent compensation amount determination device 20-3, by using vehicle movement information.

The steering condition-dependent compensation amount determination device 20-3 determines different gains or restoration torques (restoration amount) varying depending on steering conditions (for example, steering, holding, and returning to the center) of the steering wheel steered by the driver.

The steering condition-dependent compensation amount determination device 20-3 determines gains or restoration torques (restoration amount) varying depending on steering conditions (for example, steering, holding, and returning to the center) according to a difference ($\theta_{SAS}-\theta_{MOTOR}$) between a real steering angle ($\theta_{SAS}$) detected by a steering angle sensor (SAS) while steering the steering wheel and a motor angle ($\theta_{MOTOR}$) made by operation of the motor and detected by a motor angle sensor while steering the steering wheel.

Accordingly, a multiplier 24-5 multiplies a steering condition-dependent gain, which is determined by the steering condition-dependent compensation amount determination device 20-3, by the basic steering torque assist compensation amount (basic compensation amount), and the result is output.

In other words, the steering condition-dependent gain, which is determined by the steering condition-dependent compensation amount determination device 20-3, is multiplied by the basic steering torque assist compensation amount (basic compensation amount), and thus the additional steering torque compensation amount (final compensation amount) is obtained and output to the motor 30.

Alternatively, an adder 24-6 sums a steering condition-dependent restoration torque (torque for returning to the original position after steering the steering wheel) determined by the steering condition-dependent compensation amount determination device 20-3 and the basic steering torque assist compensation (basic compensation amount), and thus the additional steering torque compensation amount (final compensation amount) is obtained and output to the motor 30.

The final compensation amount confirmation device 20-4 is provided to confirm the accuracy of the additional steering torque compensation amount (final compensation amount) determined by the steering condition-dependent compensation amount determination device 20-3 on the basis of the vehicle movement characteristics. The final compensation amount confirmation device 20-4 checks the accuracy of the vehicle movement characteristics and outputs a gain for maintaining or reducing the additional steering torque compensation amount (final compensation amount) determined by the steering condition-dependent compensation amount determination device 20-3.

Specifically, the final compensation amount confirmation device 20-4 receives actual vehicle movement information (for example, lateral acceleration (LATAC) and yaw rate at the present steering angle and vehicle speed) through CAN communication, and then compares the information with movement prediction information of a corresponding vehicle model at the same steering angle and vehicle speed (LATAC and yaw rate) stored in the controller. The final compensation amount confirmation device 20-4 outputs 100% gain when there is no difference, otherwise outputs 0 to 100% of gain.

In other words, when the actual vehicle movement information is the same as the vehicle model-based movement prediction information, the final compensation amount confirmation device 20-4 confirms the accuracy of the additional steering torque compensation amount (final compensation amount) determined by the steering condition-dependent compensation amount determination device 20-3 and outputs 100% gain. On the contrary, when the actual vehicle movement information is different from the vehicle model-based movement prediction information, the final compensation amount confirmation device 20-4 outputs a gain between 0 to 100% that is determined by a real difference and tuning.

Here, a method of controlling the MDPS having the above-described configuration according to the present disclosure will be described.

Figure 6:
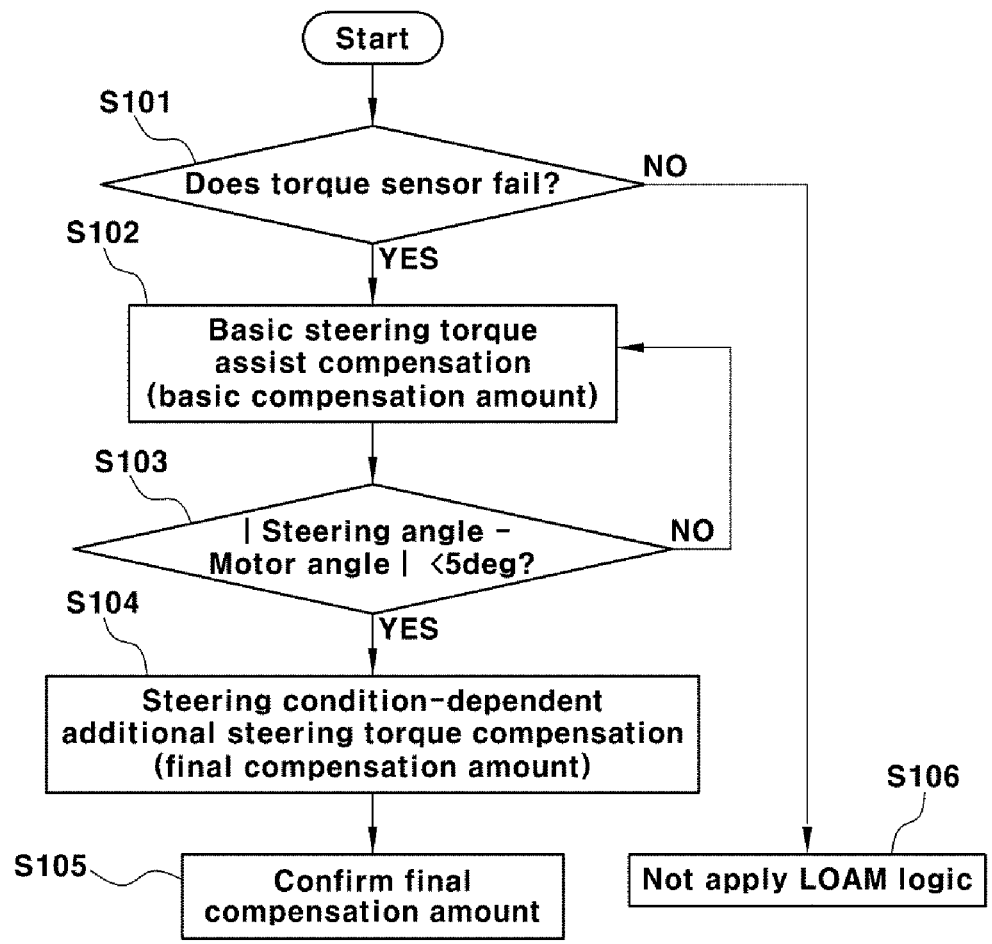
FIG. 6 is a flowchart illustrating a method of controlling an MDPS according to the present disclosure.

The accompanying drawing FIG. 6 is a flowchart illustrating the method of controlling the MDPS according to the present disclosure.

It is checked whether the torque sensor fails (S101).

For example, when the controller 20 does not receive a detection signal of the torque sensor for more than a predetermined time, it is determined that the torque sensor fails.

Subsequently, when the torque sensor is in a fail state, the LOAM compensation device 20-2 of the controller 20 performs a basic steering torque assist compensating step (S102).

At the basic steering torque assist compensating step, when steering the steering wheel, the LOAM compensation device 20-2 of the controller 20 outputs a basic steering torque assist compensation amount (basic compensation amount) to the motor 30 using the assist torque map pre-established on the basis of the vehicle movement information as described above, whereby steering assist can be easily made.

Subsequently, in order to determine whether a signal of the SAS matches with a signal of the motor angle sensor, it is checked whether the absolute value of a difference between a steering angle detected by the SAS and a motor angle (estimated steering angle) detected by the motor angle sensor is smaller than a reference angle (for example, about 5°) (S103).

Figure 1:
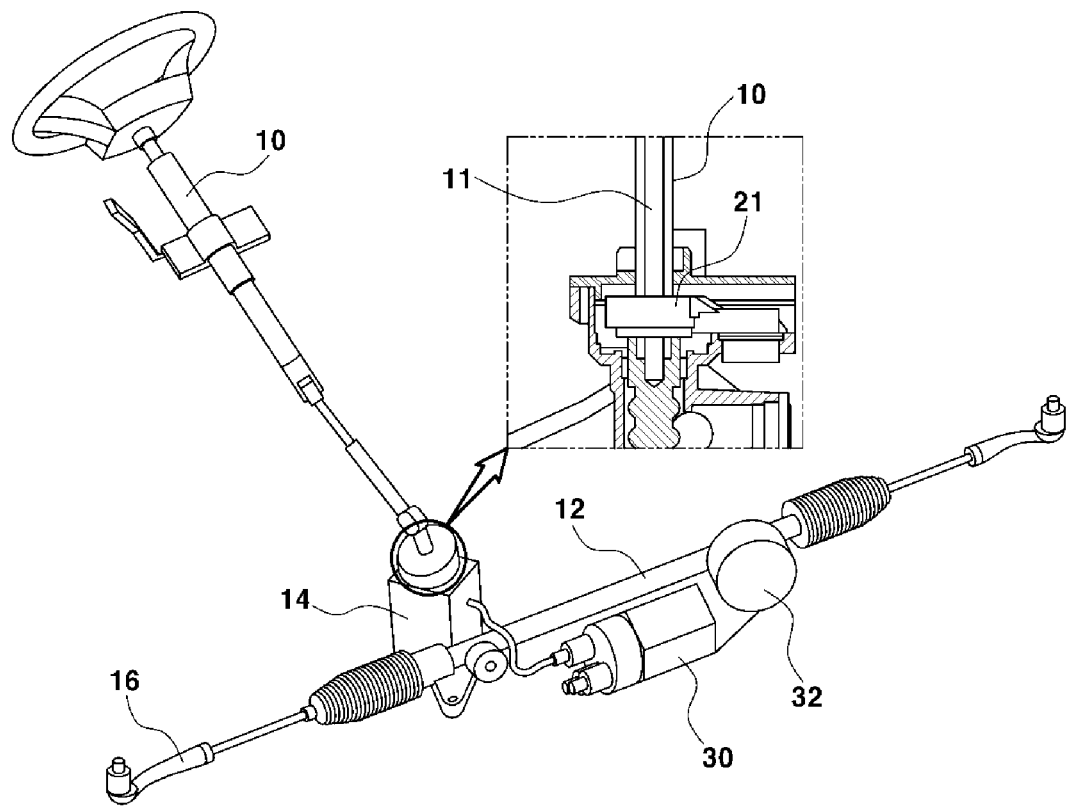
FIG. 1 is a schematic view illustrating a configuration of a motor-driven power steering (MDPS) system.
Figure 2:
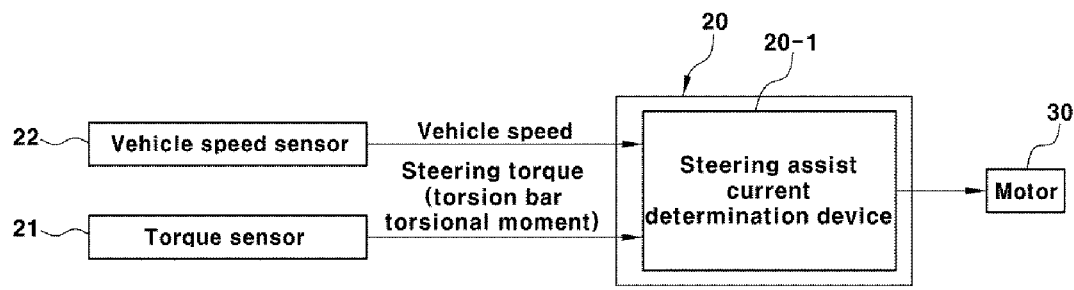
FIG. 2 is a control block diagram of the MDPS system.
Figure 3:
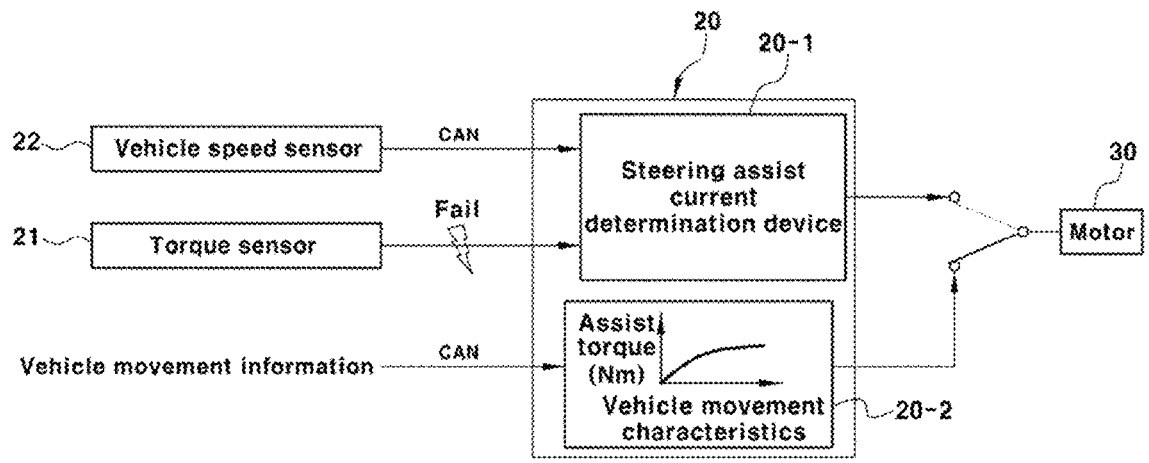
FIG. 3 is a control block diagram of the MDPS system further including a loss of assist mitigation (LOAM) compensation device.
Figure 4:
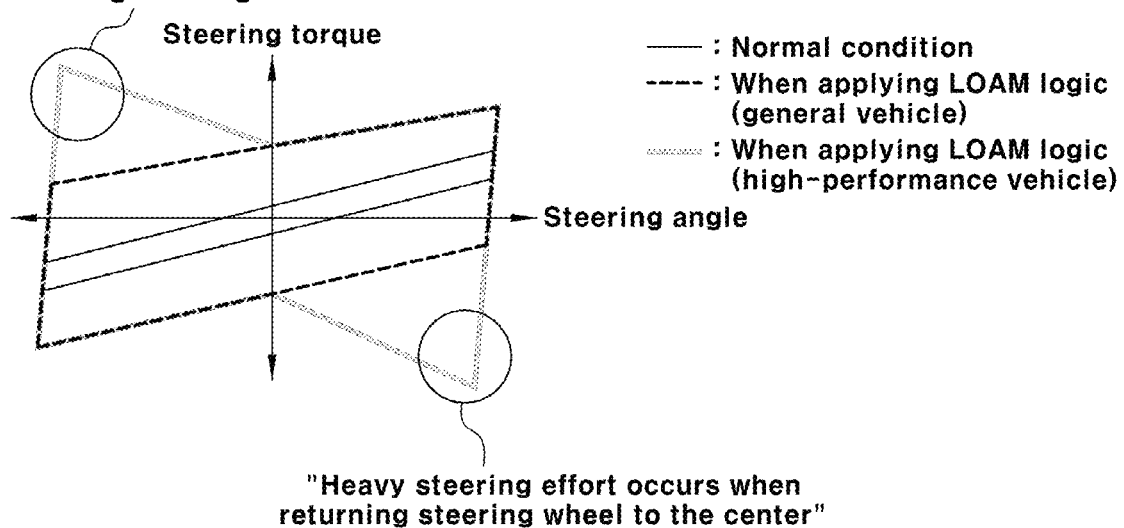
FIG. 4 is a torque diagram when steering torque assist compensation is made by the LOAM compensation device of the MDPS system.

For reference, as illustrated in FIG. 1, the SAS is mounted on a steering shaft connected to the steering wheel, and the motor angle sensor is mounted on the motor 30.

As a result of checking at the S103, when the absolute value of the difference between the real steering angle detected by the SAS and the motor angle (estimated steering angle) detected by the motor angle sensor is smaller than the reference angle (for example, about 5°), it is determined that a signal of the SAS and a signal of the motor angle sensor match in good quality. Accordingly, the additional steering torque assist compensation can be easily made in a state where the signals match in good quality.

Next, in a state where signals of the SAS and the motor angle sensor match in good quality, a steering condition dependent-additional steering torque assist compensation amount (final compensation amount) calculating step is performed to maintain or reduce the basic steering torque assist compensation amount (S104).

The additional steering torque assist compensation amount (final compensation amount) calculating step includes a process in which the steering condition-dependent compensation amount determination device 20-3 of the controller 20 determines different gains varying depending on steering conditions of the steering wheel steered by the driver (for example, steering, holding, and returning to the center) and a process in which the multiplier 24-5 multiplies the determined steering condition-dependent gain by the basic steering torque assist compensation amount.

Specifically, the steering condition-dependent compensation amount determination device 20-3 determines a steering condition on the basis of a difference ($\theta_{SAS}-\theta_{MOTOR}$) between a real steering angle ($\theta_{SAS}$) detected by the SAS while steering the steering wheel and a motor angle ($\theta_{MOTOR}$) made by operation of the motor and detected by the motor angle sensor and then determines gains varying depending on steering conditions. The multiplier 24-5 multiplies the determined steering condition-dependent gain by the basic steering torque assist compensation amount (basic compensation amount).

Here, the absolute value of the difference ($\theta_{SAS}-\theta_{MOTOR}$) between the steering angle ($\theta_{SAS}$) and the motor angle ($\theta_{MOTOR}$) is less than the reference angle (for example, about 5°).

As described above, the steering condition-dependent gain determined by the steering condition-dependent compensation amount determination device 20-3 is multiplied by the basic steering torque assist compensation (basic compensation amount), and thus the additional steering torque compensation amount (final compensation amount) is obtained and output to the motor.

A final compensation amount confirming step may be proceeded to confirm the accuracy of the additional steering torque compensation amount (final compensation amount) determined by the steering condition-dependent compensation amount determination device 20-3.

For example, the final compensation amount confirmation device 20-4 receives actual vehicle movement information (for example, LATAC and yaw rate at the present steering angle and vehicle speed) through the CAN communication, and then compares the information with movement prediction information (LATAC and yaw rate) of the corresponding vehicle model at the same steering angle and vehicle speed which is stored in the controller. The final compensation amount confirmation device 20-4 outputs 100% gain when there is no difference, otherwise outputs 0 to 100% of gain.

In other words, when the actual vehicle movement information is the same as the vehicle model-based movement prediction information, the final compensation amount confirmation device 20-4 confirms the accuracy of the additional steering torque compensation amount (final compensation amount) determined by the steering condition-dependent compensation amount determination device 20-3 and outputs 100% gain. On the contrary, when the actual vehicle movement information is different from the vehicle model-based movement prediction information, the final compensation amount confirmation device 20-4 outputs a gain between 0 to 100% that is determined by a real difference and tuning. Accordingly, the additional steering torque compensation amount (final compensation amount) can be maintained or further reduced.

On the other hand, when the controller 20 receives a detection signal of the torque sensor for more than a predetermined time, it is determined that the torque sensor properly functions (e.g., the torque sensor does not fail) (S101). In this case, basic steering torque assist compensation made by a LOAM compensation logic is not applied (S106).

Each example in which steering torque assist is made for each steering condition in a state where a torque sensor of a high-performance vehicle fails is as follows.

Steering the Steering Wheel

Figures 7A, 7B:
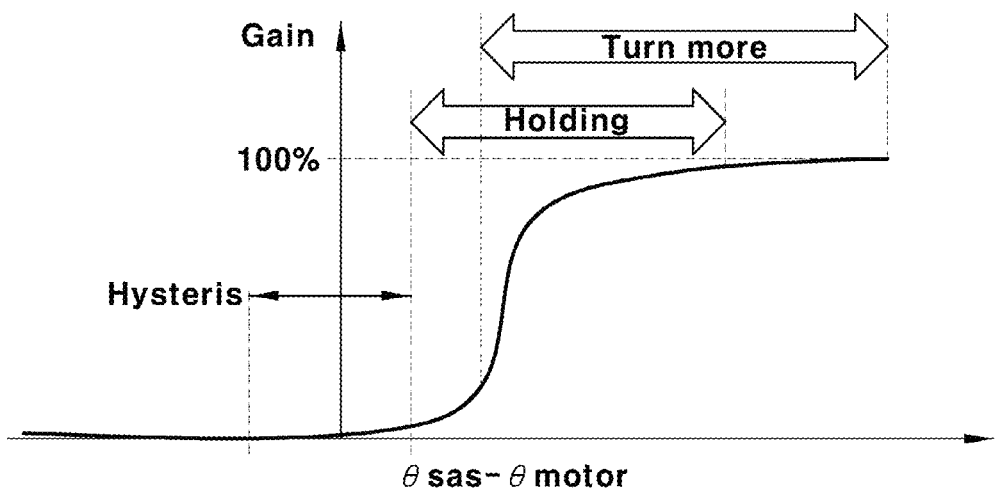
FIG. 7A is a diagram illustrating an example in which steering torque assist compensation is made according to the system and method of controlling the MDPS according to the present disclosure when steering and holding a steering wheel.
FIG. 7B is a graph illustrating an example of map data determining gain for steering conditions.

Referring to FIG. 7A, in steering the steering wheel (for example, turning the steering wheel more) which is one of steering conditions, the steering condition-dependent compensation amount determination device 20-3 calculates the difference ($\theta_{hys}=\theta_{SAS}-\theta_{MOTOR}$) between the steering angle ($\theta_{SAS}$) detected by the SAS and the motor angle ($\theta_{MOTOR}$) made by operation of the motor and detected by the motor angle sensor.

When steering the steering wheel, the steering angle ($\theta_{SAS}$) is usually greater than the motor angle ($\theta_{MOTOR}$) due to clearance, friction, or the like, in the steering system.

For example, when steering the steering wheel, the difference ($\theta_{hys}=\theta_{SAS}-\theta_{MOTOR}$) between the steering angle ($\theta_{SAS}$) and the motor angle ($\theta_{MOTOR}$) may be 1°.

In steering of the steering wheel which is one of steering conditions, in a case where the steering condition-dependent compensation amount determination device 20-3 calculates and obtains the result as described above that the steering angle ($\theta_{SAS}$) is greater than the motor angle ($\theta_{MOTOR}$), the steering condition-dependent gain is determined to be 100% or close to 100% by using map data or the like, which determines a steering condition-dependent gain and is illustrated in FIG. 7B.

As described above, when the steering condition-dependent compensation amount determination device 20-3 determines that the steering condition-dependent gain is 100%, the additional steering torque compensation amount (final compensation amount) obtained by multiplying the steering condition-dependent gain 100% and the basic steering torque assist compensation amount (basic compensation amount) becomes the basic steering torque assist compensation amount as a result.

Thus, when steering the steering wheel (for example, turning the steering wheel more) which is one of steering conditions while the torque sensor of the high-performance vehicle fails, the basic steering torque assist compensation amount is output to the motor as it is such that the steering torque assist compensation in which assist torque is constantly increased can be easily made, and thus steering effort felt by the driver can be reduced.

For reference, since the driver grips the steering wheel to steer the steering wheel, a driver torque (T) and a system stiffness (K) may be considered when calculating the difference ($\theta_{hys}=\theta_{SAS}-\theta_{MOTOR}$) between the steering angle ($\theta_{SAS}$) and the motor angle ($\theta_{MOTOR}$).

For example, the driver torque (T) may be set to 8.4 N m, the system stiffness (K) may be set to 2.8 N m.

Accordingly, when steering the steering wheel, a value of driver torque (T)/system stiffness (K) is added to the difference ($\theta_{hys}=\theta_{SAS}-\theta_{MOTOR}$) between the steering angle ($\theta_{SAS}$) and the motor angle ($\theta_{MOTOR}$) in order to obtain a real value of the difference between the steering angle ($\theta_{SAS}$) and the motor angle ($\theta_{MOTOR}$), which is equal to or more than 4 as illustrated in FIG. 7A.

Holding the Steering Wheel

Referring to FIG. 7A, in holding the steering wheel after steering which is one of steering conditions, the steering condition-dependent compensation amount determination device 20-3 calculates the difference ($\theta_{hys}=\theta_{SAS}-\theta_{MOTOR}$) between the steering angle ($\theta_{SAS}$) detected by the SAS and the motor angle ($\theta_{MOTOR}$) made by operation of the motor and detected by the motor angle sensor.

Even when holding the steering wheel after steering, the steering angle ($\theta_{SAS}$) is usually greater than the motor angle ($\theta_{MOTOR}$) due to separations, friction, or the like, in the steering system.

For example, when holding the steering wheel after steering, the difference ($\theta_{hys}=\theta_{SAS}-\theta_{MOTOR}$) between the steering angle ($\theta_{SAS}$) and the motor angle ($\theta_{MOTOR}$) may be 1°.

In holding of the steering wheel after steering which is one of steering conditions, in a case where the steering condition-dependent compensation amount determination device 20-3 calculates and obtains the result as described above that the steering angle ($\theta_{SAS}$) is greater than the motor angle ($\theta_{MOTOR}$), the steering condition-dependent gain is determined to be 100% or close to 100% by using map data or the like, which determines a steering condition-dependent gain and is illustrated in FIG. 7B.

As described above, when the steering condition-dependent compensation amount determination device 20-3 determines that the steering condition-dependent gain is 100%, the additional steering torque compensation amount (final compensation amount) obtained by multiplying the steering condition-dependent gain 100% and the basic steering torque assist compensation amount (basic compensation amount) becomes the basic steering torque assist compensation amount as a result.

Thus, when holding the steering wheel after steering which is one of steering conditions in a state where the torque sensor of the high-performance vehicle fails, the basic steering torque assist compensation amount is output to the motor as it is such that the steering torque assist compensation in which assist torque is constantly increased can be easily made.

For reference, since the driver grips the steering wheel to hold the steering wheel after steering, a driver torque (T) and a system stiffness (K) may be considered when calculating the difference ($\theta_{hys}=\theta_{SAS}-\theta_{MOTOR}$) between the steering angle ($\theta_{SAS}$) and the motor angle ($\theta_{MOTOR}$).

For example, the driver torque (T) may be set to 8.4 N m, the system stiffness (K) may be set to 2.8 N m.

Accordingly, when holding the steering wheel after steering, a value of driver torque (T)/system stiffness (K) is added to the difference ($\theta_{hys}=\theta_{SAS}-\theta_{MOTOR}$) between the steering angle ($\theta_{SAS}$) and the motor angle ($\theta_{MOTOR}$) in order to obtain a real value of the difference between the steering angle ($\theta_{SAS}$) and the motor angle ($\theta_{MOTOR}$), which is exactly 4 as illustrated in FIG. 7A.

Releasing the Steering Wheel

Figures 8A, 8B:
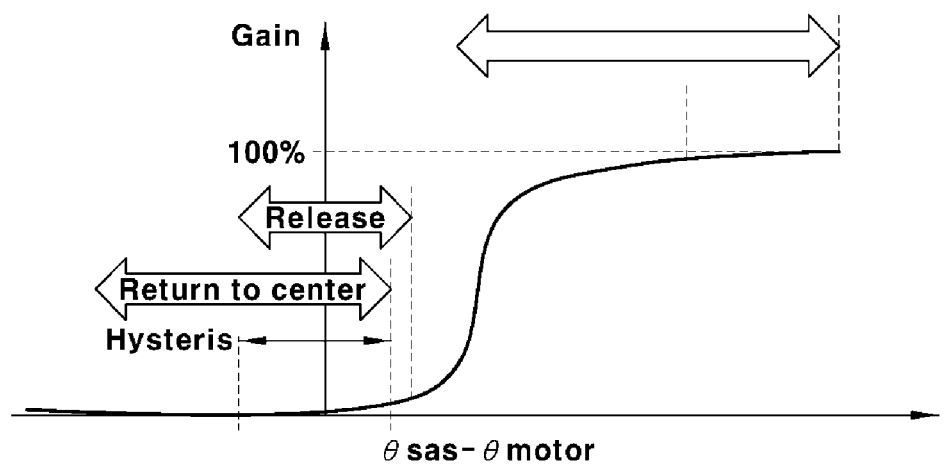
FIG. 8A is a view illustrating an example in which steering torque assist compensation is made according to the system and method of controlling the MDPS according to the present disclosure when releasing and returning a steering wheel to the center.
FIG. 8B is a graph illustrating an example of map data determining gain for steering conditions.

Referring to FIG. 8A, in releasing the steering wheel after steering which is one of steering conditions, the steering condition-dependent compensation amount determination device 20-3 calculates the difference ($\theta_{hys}=\theta_{SAS}-\theta_{MOTOR}$) between the steering angle ($\theta_{SAS}$) detected by the SAS and the motor angle ($\theta_{MOTOR}$) made by operation of the motor and detected by the motor angle sensor.

When the driver releases the steering wheel after steering the steering wheel, extra torque applied to the steering system is generally removed. Accordingly, the difference between the steering angle ($\theta_{SAS}$) and the motor angle ($\theta_{MOTOR}$) is much smaller compared with the differences occurring when the steering the steering wheel and the holding the steering wheel, and the difference is within a hysteresis value due to separations and friction in the steering system.

For example, when holding the steering wheel after steering, the difference ($\theta_{hys}=\theta_{SAS}-\theta_{MOTOR}$) between the steering angle ($\theta_{SAS}$) and the motor angle ($\theta_{MOTOR}$) may be in a range of −1° to 1°.

For reference, since the driver releases the steering wheel after steering, the driver torque (T) is zero, and thus the driver torque (T) and the system stiffness (K) may not be considered when calculating the difference ($\theta_{hys}=\theta_{SAS}-\theta_{MOTOR}$) between the steering angle ($\theta_{SAS}$) and the motor angle ($\theta_{MOTOR}$).

In releasing the steering wheel after steering which is one of steering conditions, in a case where the steering condition-dependent compensation amount determination device 20-3 calculates and obtains the result as described above that the difference between the steering angle ($\theta_{SAS}$) and the motor angle ($\theta_{MOTOR}$) is within the hysteresis value such as in the range of −1° to +1° due to separation and friction in the steering system, the steering condition-dependent gain is determined to be a value close to 0% by using map data or the like, which determines a steering condition-dependent gain and is illustrated in FIG. 8B.

In addition, when the steering condition-dependent compensation amount determination device 20-3 determines that a value of the steering condition-dependent gain is close to 0%, the additional steering torque compensation amount (final compensation amount) obtained by multiplying the steering condition-dependent gain (the value close to 0%) and the basic steering torque assist compensation amount (basic compensation amount) is close to zero as a result.

Thus, when releasing the steering wheel after steering which is one of steering conditions in a state where the torque sensor of the high-performance vehicle fails, the additional steering torque compensation amount (final compensation amount) is almost zero, and thus almost no steering torque assist compensation is made.

As described above, when releasing the steering wheel after steering which is one of steering conditions in a state where the torque sensor of the high-performance vehicle fails, the steering wheel can be easily returned to the original position thereof (center direction) by a return spring inside a steering column or the like. Accordingly, the steering torque assist compensation amount is forcedly reduced to almost zero whereby unnecessary steering torque assist compensation is avoided.

Returning the Steering Wheel to the Center

Referring to FIG. 8A, in returning the steering wheel to the center after steering which is one of steering conditions, the steering condition-dependent compensation amount determination device 20-3 calculates the difference ($\theta_{hys}=\theta_{SAS}-\theta_{MOTOR}$) between the steering angle ($\theta_{SAS}$) detected by the SAS and the motor angle ($\theta_{MOTOR}$) made by operation of the motor and detected by the motor angle sensor.

When the driver steers the steering wheel and then returns the steering wheel to the center while gripping the steering wheel, the steering angle ($\theta_{SAS}$) is usually much smaller than the motor angle ($\theta_{MOTOR}$).

For example, when returning the steering wheel to the center, the difference ($\theta_{hys}=\theta_{SAS}-\theta_{MOTOR}$) between the steering angle ($\theta_{SAS}$) and the motor angle ($\theta_{MOTOR}$) may be −1°.

For reference, since the driver grips the steering wheel to return the steering wheel to the center, the driver torque (T) and the system stiffness (K) may be considered when calculating the difference ($\theta_{hys}=\theta_{SAS}-\theta_{MOTOR}$) between the steering angle ($\theta_{SAS}$) and the motor angle ($\theta_{MOTOR}$).

For example, the driver torque (T) may be set to −8.4 N m, the system stiffness (K) may be set to 2.8 N m.

Accordingly, when returning the steering wheel to the center after steering, a value of driver torque (T)/system stiffness (K) is added to the difference ($\theta_{hys}=\theta_{SAS}-\theta_{MOTOR}$) between the steering angle ($\theta_{SAS}$) and the motor angle ($\theta_{MOTOR}$) in order to obtain a real value of the difference between the steering angle ($\theta_{SAS}$) and the motor angle ($\theta_{MOTOR}$), which is equal to or less than −4 as illustrated in FIG. 8A.

In returning the steering wheel to the center which is one of steering conditions, in a case where the steering condition-dependent compensation amount determination device 20-3 calculates and obtains the result as described above that the difference between the steering angle ($\theta_{SAS}$) and the motor angle ($\theta_{MOTOR}$) is equal to or less than −1°, the steering condition-dependent gain is determined to be a value close to 0% by using map data or the like, which determines a steering condition-dependent gain and is illustrated in FIG. 8B.

In addition, when the steering condition-dependent compensation amount determination device 20-3 determines that a value of the steering condition-dependent gain is close to 0%, the additional steering torque compensation amount (final compensation amount) obtained by multiplying the steering condition-dependent gain (the value close to 0%) and the basic steering torque assist compensation amount (basic compensation amount) is close to zero as a result.

Thus, when returning the steering wheel to the center which is one of steering conditions in a state where the torque sensor of the high-performance vehicle fails, the additional steering torque compensation amount (final compensation amount) is almost zero, and thus almost no steering torque assist compensation is made.

The aforementioned operations/functions performed by the controller and/or components thereof can be embodied as computer readable code/algorithm/software stored on a computer readable recording medium. The computer readable recording medium is any data storage device that can store data which can thereafter be read by a computer or a processor/microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The aforementioned controller may include one or more processors/microprocessors and a non-transitory computer readable recording medium storing computer readable code/algorithm/software. Such processor(s)/microprocessor(s) may perform the above described operations/functions, by executing the computer readable code/algorithm/software stored on the computer readable recording medium.

In addition, although not shown, the system or the controller may further include a storage, such as a memory, for storing pre-established assist torque map which may be read by the controller and/or components thereof.

As described above, when returning the steering wheel to the center which is one of steering conditions in a state where the torque sensor of the high-performance vehicle fails, the steering torque assist compensation amount is forcedly reduced to almost zero whereby it is possible to avoid high assist load from being made when the basic steering torque assist compensation amount is applied to the motor, thereby reducing steering effort.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A system for controlling a motor-driven power steering, the system comprising:
   a steering assist current determination device determining steering assist amount according to torsional moment of a torsion bar which varies depending on a vehicle speed;
   a loss of assist mitigation (LOAM) compensation device outputting basic steering torque assist compensation amount to a motor when a torque sensor fails; and
   a steering condition-dependent compensation amount determination device determining and outputting additional steering torque compensation amount to the motor to maintain or reduce the basic steering torque assist compensation amount,
   wherein the steering condition dependent compensation amount determination device determines gain or restoration torque, which varies depending on steering conditions including steering, holding, releasing, and returning to a center of a steering wheel, according to a difference ($\theta_{SAS}-\theta_{MOTOR}$) between a steering angle ($\theta_{SAS}$) detected by a steering angle sensor (SAS) and a motor angle ($\theta_{MOTOR}$) detected by a motor angle sensor, and
   wherein the steering condition dependent compensation amount determination device is configured to check whether an absolute value of the difference ($\theta_{SAS}-\theta_{MOTOR}$) between the $\theta_{SAS}$ and the $\theta_{MOTOR}$ is smaller than a reference angle to determine whether a signal of the SAS matches with a signal of the motor angle sensor, before the determining of the additional steering torque compensation amount.

2. The system of claim 1, further comprising:
   a final compensation amount confirmation device confirming the additional steering torque compensation amount, which is determined by the steering condition-dependent compensation amount determination device, by using vehicle movement information.

3. The system of claim 2, wherein the final compensation amount confirmation device checks accuracy of vehicle movement characteristics and outputs a gain for maintaining or reducing the additional steering torque compensation amount determined by the steering condition-dependent compensation amount determination device.

4. The system of claim 1, wherein the additional steering torque compensation amount is obtained by a multiplier multiplying a steering condition-dependent gain determined by the steering condition-dependent compensation amount determination device by the basic steering torque assist compensation amount.

5. A method of controlling a motor-driven power steering, the method comprising:
   checking whether a torque sensor fails;
   compensating basic steering torque assist by a loss of assist mitigation (LOAM) compensation device when the torque sensor is in a fail state;
   calculating additional steering torque assist compensation amount by a steering condition-dependent compensation amount determination device to maintain or reduce the basic steering torque assist compensation amount according to a steering condition of a steering wheel; and
   checking whether an absolute value of a difference between a steering angle ($\theta_{SAS}$) detected by a steering angle sensor (SAS) and a motor angle ($\theta_{MOTOR}$) detected by a motor angle sensor is smaller than a reference angle to determine whether a signal of the SAS matches with a signal of the motor angle sensor, before the calculating of the additional steering torque assist compensation amount.

6. The method of claim 5, wherein the compensating of the basic steering torque assist is performed by the LOAM compensation device that determines the basic steering torque assist compensation amount by using an assist torque map pre-established on the basis of vehicle movement information and outputs the basic steering torque assist compensation amount to the motor.

7. The method of claim 5, wherein when the difference between $\theta_{SAS}$ and $\theta_{MOTOR}$ is smaller than the reference angle, compensating of the additional steering torque assist compensation is performed according to the steering condition.

8. The method of claim 5, wherein the calculating of the additional steering torque assist compensation amount includes:

determining a steering condition of the steering wheel including steering, holding, releasing, and returning to a center of the steering wheel, and determining a steering condition-dependent gain by the steering condition-dependent compensation amount determination device; and multiplying the determined steering condition-dependent gain by the basic steering torque assist compensation amount using a multiplier.

9. The method of claim 8, wherein the steering condition of the steering wheel is determined on basis of a driver torque, a system stiffness, and the difference ($\theta_{SAS}-\theta_{MOTOR}$) between $\theta_{SAS}$ and $\theta_{MOTOR}$.

10. The method of claim 8, wherein, while steering the steering wheel which is one of the steering conditions, when the steering condition-dependent compensation amount determination device calculates and obtains a result that $\theta_{SAS}$ is greater than $\theta_{MOTOR}$, the steering condition-dependent gain is determined to be 100% or close to 100%, and then the determined steering condition dependent gain 100% is multiplied by the basic steering torque assist compensation amount to obtain the additional steering torque compensation amount.

11. The method of claim 8, wherein, while holding the steering wheel after steering which is one of the steering conditions, when the steering condition-dependent compensation amount determination device calculates and obtains a result that $\theta_{SAS}$ is greater than $\theta_{MOTOR}$, the steering condition-dependent gain is determined to be 100% or close to 100%, and then the determined steering condition-dependent gain 100% is multiplied by the basic steering torque assist compensation amount to obtain the additional steering torque compensation amount.

12. The method of claim 8, wherein, while releasing the steering wheel after steering which is one of the steering conditions, when the steering condition-dependent compensation amount determination device calculates and obtains a result that the difference between $\theta_{SAS}$ and $\theta_{MOTOR}$ is within a hysteresis value due to clearance and friction in a steering system, the steering condition-dependent gain is determined to be a value close to 0%, and then the determined steering condition-dependent gain (the value close to 0%) is multiplied by the basic steering torque assist compensation amount to obtain the additional steering torque compensation amount.

13. The method of claim 8, wherein, while returning the steering wheel to the center which is one of the steering conditions, when the steering condition-dependent compensation amount determination device calculates and obtains a result that the difference between $\theta_{SAS}$ and $\theta_{MOTOR}$ is equal to or smaller than $-1°$, the steering condition-dependent gain is determined to be a value close to 0%, and then the determined steering condition-dependent gain (the value close to 0%) is multiplied by the basic steering torque assist compensation amount to obtain the additional steering torque compensation amount.

14. The method of claim 5, further comprising:

checking accuracy of vehicle movement characteristics by a final compensation amount confirmation device to maintain or reduce the additional steering torque compensation amount determined by the steering condition-dependent compensation amount determination device, and then outputting a gain by the final compensation amount confirmation device, the gain being to be multiplied by the additional steering torque compensation amount.

15. A non-transitory computer-readable medium storing computer-executable instructions, when executed by a processor, causing the processor to perform the method of claim 5.

16. A system for controlling a motor-driven power steering, the system comprising a processor configured to:

determine steering assist amount according to torsional moment of a torsion bar which varies depending on a vehicle speed;

output basic steering torque assist compensation amount to a motor when a torque sensor fails;

determine and output additional steering torque compensation amount to the motor to maintain or reduce the basic steering torque assist compensation amount; and check whether an absolute value of a difference between a steering angle detected by a steering angle sensor (SAS) and a motor angle detected by a motor angle sensor is smaller than a reference angle to determine whether a signal of the SAS matches with a signal of the motor angle sensor, before the determining of the additional steering torque compensation amount.

* * * * *